(12) United States Patent
Demoto et al.

(10) Patent No.: US 7,343,400 B2
(45) Date of Patent: Mar. 11, 2008

(54) COMMUNICATION SYSTEM

(75) Inventors: Katsuya Demoto, Higashihiroshima (JP); Yoshinori Fujita, Higashihiroshima (JP); Yoshiro Nakano, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 724 days.

(21) Appl. No.: 09/901,125

(22) Filed: Jul. 10, 2001

(65) Prior Publication Data
US 2002/0038370 A1   Mar. 28, 2002

(30) Foreign Application Priority Data
Jul. 28, 2000   (JP) .............................. 2000-229388

(51) Int. Cl.
*G06F 15/16* (2006.01)
*G06F 15/173* (2006.01)

(52) U.S. Cl. ............. 709/219; 709/203; 709/208; 709/224; 709/228; 709/233

(58) Field of Classification Search ................ 709/224, 709/203, 208, 219, 228, 233
See application file for complete search history.

(56) References Cited

U.S. PATENT DOCUMENTS

| | | | | |
|---|---|---|---|---|
| 5,446,730 A | * | 8/1995 | Lee et al. | 370/351 |
| 5,583,922 A | * | 12/1996 | Davis et al. | 379/93.09 |
| 6,128,279 A | * | 10/2000 | O'Neil et al. | 370/229 |
| 6,223,221 B1 | * | 4/2001 | Kunz | 709/224 |
| 6,493,758 B1 | * | 12/2002 | McLain | 709/227 |
| 6,631,409 B1 | * | 10/2003 | Watson et al. | 709/224 |
| 2001/0037359 A1 | * | 11/2001 | Mockett et al. | 709/203 |

FOREIGN PATENT DOCUMENTS

| | | | |
|---|---|---|---|
| EP | 0 848 560 | * | 6/1998 |
| EP | 0 848 560 A2 | | 6/1998 |
| JP | 6-133083 A | | 5/1994 |
| JP | 7-79271 | | 3/1995 |

OTHER PUBLICATIONS

Notification of Reasons for Refusal dated Jul. 29, 2003 in corresponding Japanese patent application No. 2000-229388.
European Search Report mailed Mar. 2, 2004 in corresponding EP application No. 01306027.2-1244.

* cited by examiner

*Primary Examiner*—Jason Cardone
*Assistant Examiner*—Tanim Hossain
(74) *Attorney, Agent, or Firm*—Nixon & Vanderhye, PC

(57) ABSTRACT

An example communication apparatus is capable of performing communication with an information server in first and second communication modes. After establishing a connection with the information server in the first communication mode and receiving an information acquisition request, the communication apparatus stores a condition of the communication connection with the information server as connection information, disconnects the communication in the first communication mode, establishes a connection with the information server in the second communication mode, and restores the communication connection with the information server based on the stored connection information.

22 Claims, 15 Drawing Sheets

COMMUNICATION SYSTEM

BACKGROUND OF THE INVENTION

1. Field of the Invention

The present invention relates to a communication system having a communication apparatus and an information server capable of performing communication in first and second communication modes.

2. Description of the Related Art

Conventionally, in a communication system having a communication apparatus such as a mobile terminal that transmits and receives text data comprising character data and multimedia data such as sound, images or moving images, and an information server, the communication mode which is used in information acquisition of the communication apparatus from the information server is selected and fixed in requesting the information, and the selected communication mode is not changed until the information acquisition is completed.

There is known such a communication mode as one of communication modes having a plurality of channels as communication paths that when during communication in a normal communication channel the information transfer rate is insufficient, in addition to the normal communication channel, additional connection to a second channel is carried out, and in response to a request to disconnect the connection to the second channel, changeover of communication path is automatically carried out so that only the normal communication channel is used.

However, the communication channel switching control, which is possible in communication modes having a plurality of channels as communication paths, cannot be applied to communication modes having only one communication channel.

Moreover, in conventional communication systems capable of performing communication in a plurality of communication modes, the communication mode can be switched before a request for information acquisition is made, however, after a request for information acquisition is made, the communication mode is fixed to the one selected when the request for information acquisition is made, and the communication mode cannot be changed unless information acquisition is temporarily stopped and the communication condition is re-connected. For this reason, in the conventional communication system, even when information to be acquired from the information server can be more efficiently transferred in terms of the communication time, communication charge or the like in a communication mode other than the communication mode selected when the request for information acquisition is made, it is difficult to perform switching of communication mode and restore connection conditions, and therefore, the communication mode is seldom switched.

There is known a communication mode in which although the maximum rate of information transfer is low, the communication charge is made according to the amount of transmitted and received information. This mode is advantageous for viewing multimedia data because the data is viewed after its acquisition, however, a great deal of communication time is required to download music information data or the like.

Moreover, there is known a communication mode in which the information transfer rate is higher than that of the above-described communication mode and data can be acquired in a short time. This mode, however, is unsuitable for viewing multimedia data, which is viewed after its acquisition, because the communication charge is made according to the communication time.

Japanese Unexamined Patent Publication JP-A 11-275143 (1999) proposes a communication control method for a communication apparatus that performs data transmission/reception through a radio interface with a data communication terminal connected to a sub apparatus through a data communication apparatus, and performs data transmission/reception through a digital network interface with a data communication terminal connected to a digital network through a data communication apparatus. According to this communication control method, although the communication mode switching control is performed, it is necessary to newly set communication conditions for a selected communication mode.

SUMMARY OF THE INVENTION

An object of the invention is to provide a communication system comprising a communication apparatus and an information server capable of performing communication in first and second communication modes which communication system is capable of performing efficient communication by saving the communication charge, communication time or the like.

The invention provides a communication system comprising an information server capable of performing communication in first and second communication modes and a communication apparatus capable of performing communication in the first and the second communication modes, the communication apparatus including:

communication means capable of performing communication with the information server in the first and the second communication modes;

a connection information storage section for storing a communication connection condition as connection information; and a communication mode switching control section for controlling such that, upon reception of a request of information acquisition in the second communication mode from an operator when the communication means is connected with the information server in the first communication mode, a condition of communication connection with the information server in the first communication mode at a time of the reception of the information acquisition request is stored into the connection information storage section as connection information, switching of communication mode from the first communication mode to the second communication mode is carried out by releasing the connection of the communication means with the information server in the first communication mode and establishing a connection with the information server in the second communication mode, and the condition of communication connection is restored based on the connection information stored in the connection information storage section.

According to the invention, in the communication apparatus, after the information acquisition request to the information server is made in the first communication mode, switching to the second communication mode can be performed and the communication connection condition in the first communication mode can be restored in the second communication mode. Accordingly, switching to the communication mode suitable for the information to be acquired can be made. Additionally the communication connection condition can be automatically restored after the switching. Consequently, it is possible to save the communication charge and the expense in effort and time necessary to restore the communication connection after the switching from the first communication mode to the second communication mode.

Moreover, in the invention it is preferable that the communication apparatus includes a switching condition storage section for storing a predetermined determination reference value, and the communication mode switching control section compares an amount of information to be acquired from the information server and the determination reference value previously stored in the switching condition storage section, and determines whether to execute switching of communication mode or not, based on a result of the comparison.

According to the invention, in the communication apparatus, when the information acquisition request to the information server in the first communication mode is made, the amount of the information to be acquired is compared with the previously stored predetermined determination reference value, and whether to execute switching of communication mode or not is determined. Consequently, switching to the communication mode suitable for the amount of the information to be acquired from the information server can be made.

Moreover, in the invention it is preferable that the communication mode switching control section determines whether to execute switching of communication mode or not based on a kind of information to be acquired from the information server.

According to the invention, in the communication apparatus, when the information acquisition request to the information server in the first communication mode is made, whether to execute switching of communication mode or not is determined based on the kind of the information to be acquired. Consequently, switching to the communication mode suitable for the kind of the information to be acquired such as text data, image data, sound or a moving image can be made.

Moreover, in the invention it is preferable that the communication apparatus includes a switching condition storage section for storing a communication charge for communication connection time in each of the first and the second communication modes, and when an information acquisition request is received from the operator, the communication mode switching control section measures a communication connection time necessary for acquiring the requested information in each of the first and the second communication mode, and determines whether to execute switching of communication mode or not based on the measured communication connection times and the communication charges for the communication connection times in the first and the second communication modes, respectively, previously stored in the switching condition storage section.

According to the invention, in the communication apparatus, when the information acquisition request to the information server in the first communication mode is made, the communication connection time necessary for acquiring the information of which acquisition is requested is measured, and whether to execute switching of communication mode or not is determined based on the previously stored communication charges for the communication connection times for the first and the second communication modes. Consequently, savings in communication charge can be effectively achieved.

Moreover, in the invention it is preferable that the communication apparatus includes a switching condition storage section for storing a predetermined time, and the communication mode switching control section compares a current time and the predetermined time stored in the switching condition storage section, to determine whether to execute switching of communication mode or not.

According to the invention, in the communication apparatus, when the information acquisition request to the information server in the first communication mode is made, the current time is compared with the predetermined time stored in the storage section, and whether to execute switching of communication mode or not is determined. Consequently, a communication mode in which the communication charge is low during a time period such as nighttime and a communication mode in which the transfer rate is high during a time period such as nighttime can be supported, and the communication-charge or -time can be efficiently saved.

Moreover, in the invention it is preferable that the communication mode switching control section determines whether to execute switching of communication mode or not, based on the operator's operation.

According to the invention, in the communication apparatus, when the information acquisition request to the information server in the first communication mode is made, whether to execute switching of communication mode or not is determined based on the operator's operation. Consequently, the operator can be involved in selection of communication mode.

Moreover, in the invention it is preferable that when a communication mode switching instruction is received from the information server, the communication mode switching control section switches the communication mode, based on the switching instruction.

According to the invention, in the communication apparatus, in cases where the communication mode switching instruction is received from the information server when the information acquisition request to the information server in the first communication mode is made, switching of communication mode is performed based on the switching instruction. Consequently, the communication mode can be switched in consideration of the communication condition of the information server.

Moreover, in the invention it is preferable that the communication apparatus transmits to the information server a signal representative of whether to transmit the communication mode switching instruction from the information server to the communication apparatus or not, based on the operator's operation.

According to the invention, when the information acquisition request to the information server in the first communication mode is made, the communication apparatus transmits to the information server the signal representative of whether to transmit the communication mode switching instruction from the information server to the communication apparatus or not, based on the operator's operation. Consequently, switching to the communication mode suitable for the communication condition of the information server can be made after the operator decides whether switching of communication mode is possible or not.

Moreover, in the invention it is preferable that when the communication mode switching instruction is received from the information server, the communication mode switching control section determines whether to follow the communication mode switching instruction from the information server or not, based on the operator's operation.

According to the invention, the communication apparatus determines whether to follow the communication mode switching instruction from the information server or not, based on the operator's operation. Consequently, the communication mode can be switched with higher priority on the operator's convenience than on the switching instruction from the information server.

Moreover, the invention provides a communication system comprising:

an information server capable of performing communication in first and second communication modes; and a communication apparatus capable of performing communication in the first and the second communication modes, the communication apparatus including:

communication means capable of performing communication with the information server in the first and the second communication modes;

a connection information storage section for storing a communication connection condition as connection information;

a switching condition storage section for storing a predetermined reference value of an information transfer rate; and a communication mode switching control section for, when the communication means is acquiring information from the information server in the first communication mode, monitoring a rate of information transfer from the information server, comparing the information transfer rate being monitored and the reference value of the information transfer rate previously stored in the switching condition storage section, and in cases where the information transfer rate being monitored does not exceed the reference value, storing a condition of communication connection with the information server at that time into the connection information storage section as the connection information, disconnecting the communication in the first communication mode, establishing a connection with the information server in the second communication mode to perform switching of communication mode, and restoring the communication connection condition based on the connection information stored in the connection information storage section when the communication in the first communication mode is disconnected.

According to the invention, while the communication apparatus is acquiring information in the first communication mode, the rate of information transfer from the information server is monitored, the information transfer rate being monitored is compared with the previously stored predetermined reference value of the information transfer rate, and switching of communication mode is performed when the information transfer rate being monitored does not exceed the reference value. Consequently, switching to the communication mode suitable for the information transfer rate can be made.

Moreover, the invention provides a communication system comprising:

an information server capable of performing communication in first and second communication modes; and a communication apparatus capable of performing communication in the first and the second communication modes, the information server including:

communication means capable of performing communication with the communication apparatus in the first and the second communication modes;

a switching condition storage section for storing a predetermined reference value of an information transfer rate; and a communication mode switching control section for, when the communication means is transferring information to the communication apparatus in the first communication mode, monitoring the information transfer rate, comparing the information transfer rate being monitored and the reference value of the information transfer rate previously stored in the switching condition storage section, and in cases where the information transfer rate being monitored does not exceed the reference value, causing the communication means to transmit a communication mode switching instruction to the communication apparatus, and the communication apparatus including:

communication means capable of performing communication with the information server in the first and the second communication modes;

a connection information storage section for storing a communication connection condition as connection information; and a communication mode switching control section for, when the communication means receives the communication mode switching instruction, causing a condition of communication connection with the information server at that time to be stored in the connection information storage section as the connection information, based on the switching instruction, disconnecting the communication in the first communication mode, establishing a connection with the information server in the second communication mode to perform switching of communication mode, and restoring the communication connection condition based on the connection information stored when the communication in the first communication mode is disconnected.

According to the invention, while transferring information to the communication apparatus in the first communication mode, the information server monitors the information transfer rate, compares the information transfer rate being monitored and the previously stored predetermined reference value of the information transfer rate, and when the information transfer rate being monitored does not exceed the reference value, the information server transmits the communication mode switching instruction to the communication apparatus. Consequently, switching to the communication mode suitable for the information transfer rate can be made.

Moreover, in the invention it is preferable that after the information acquisition in the second communication mode is completed, the communication mode switching control section automatically disconnects the communication in the second communication mode, and establishes a connection with the information server in the first communication mode to perform switching of communication mode.

According to the invention, in the communication apparatus, after the information acquisition in the second communication mode is completed, the communication in the second communication mode is automatically disconnected, and a connection with the information server in the first communication mode is established to perform switching of communication mode. Consequently, communication can be efficiently performed, for example, when the first communication mode is suitable for viewing information and the second communication mode is suitable for acquiring information.

Moreover, in the invention it is preferable that after the information acquisition in the second communication mode is completed, the communication mode switching control section receives the communication mode switching instruction from the information server, automatically disconnects the communication in the second communication mode, based on the instruction from the information server, and again establishes a connection with the information server in the first communication mode to perform switching of communication mode.

According to the invention, after the information acquisition in the second communication mode, the communication apparatus receives the communication mode switching instruction from the information server. The communication in the second communication mode is automatically disconnected based on the instruction from the information server, and a connection with the information server in the first communication mode is again established to perform switching of communication mode. Consequently, communication can be efficiently performed, for example, when the first communication mode is suitable for viewing information and the second communication mode is suitable for acquiring information.

Moreover, in the invention it is preferable that after a predetermined time has elapsed since the information acquisition in the second communication mode is completed, the communication mode switching control section automatically disconnects the communication in the second communication mode, and again establishes a connection with the information server in the first communication mode to perform switching of communication mode.

According to the invention, after the predetermined time has elapsed since the information acquisition in the second communication mode is completed, the communication in the second communication mode is automatically disconnected, and a connection with the information server in the first communication mode is again established to perform switching of communication mode. Consequently, communication can be efficiently performed, for example, when the first communication mode is suitable for viewing information and the second communication mode is suitable for acquiring information.

According to the invention, in the communication apparatus can, after making the information acquisition request to the information server in the first communication mode, switching to the second communication mode is performed and the communication connection condition in the second communication mode is restored, so that switching to the communication mode suitable for the information to be acquired can be made and the communication connection condition can be automatically restored after the switching. Consequently, it is possible to save the communication charge and the expense in effort and time that is necessary for restoring the communication connection condition in which connection is established in the first communication mode, in the second communication mode after the communication mode is switched.

Moreover, the communication apparatus, when the information acquisition request to the information server in the first communication mode is made, acquires the amount of the information to be acquired from the information server, and the information amount is compared with the previously stored predetermined determination reference value, and whether to execute switching of communication mode or not is determined. Consequently, switching to the communication mode suitable for the amount of the information to be acquired from the information server can be made.

Moreover, in the communication apparatus, when the information acquisition request to the information server in the first communication mode is made, whether to execute switching of communication mode or not is determined based on the kind of the information to be acquired. Consequently, switching to the communication mode suitable for the kind of the information to be acquired such as text data, image data, sound or a moving image can be made.

Moreover, in the communication apparatus, when the information acquisition request to the information server in the first communication mode is made, the communication connection time necessary for acquiring the information of which acquisition is requested is measured, and whether to execute switching of communication mode or not is determined based on the previously stored communication charges for the elapsed communication times for the first and the second communication modes. Consequently, savings in communication charge can be effectively achieved.

Moreover, in the communication apparatus, when the information acquisition request to the information server in the first communication mode is made, the current time is compared with the predetermined time stored in the storage section, and whether to execute switching of communication mode or not is determined. Consequently, a communication mode in which the communication charge is low during a time period such as nighttime and a communication mode in which the transfer rate is high during a time period such as nighttime can be supported, and savings in communication-charge or -time can be efficiently achieved.

Moreover, in the communication apparatus, when the information acquisition request to the information server in the first communication mode is made, whether to execute switching of communication mode or not is determined based on the operator's operation. Consequently, the operator can be involved in selection of communication mode.

Moreover, in the communication apparatus, in cases where the communication mode switching instruction is received from the information server when the information acquisition request to the information server in the first communication mode is made, switching of communication mode is performed based on the switching instruction, and accordingly, the switching of communication mode can be executed in consideration of the communication condition of the information server.

Moreover, while information is being acquired in the first communication mode, the information transfer rate of the information server is monitored, the information transfer rate being monitored and the previously stored predetermined reference value of the information transfer rate are compared, and when the information transfer rate being monitored does not exceed the reference value, switching of communication mode is performed. Consequently, switching to the communication mode suitable for the information transfer rate can be made.

Moreover, in the communication apparatus, after the information acquisition in the second communication mode is completed, the communication in the second communication mode is automatically disconnected, and a connection with the information server in the first communication mode is established to perform switching of communication mode. Consequently, communication can be efficiently performed, for example, when the first communication mode is suitable for viewing information and the second communication mode is suitable for acquiring information.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
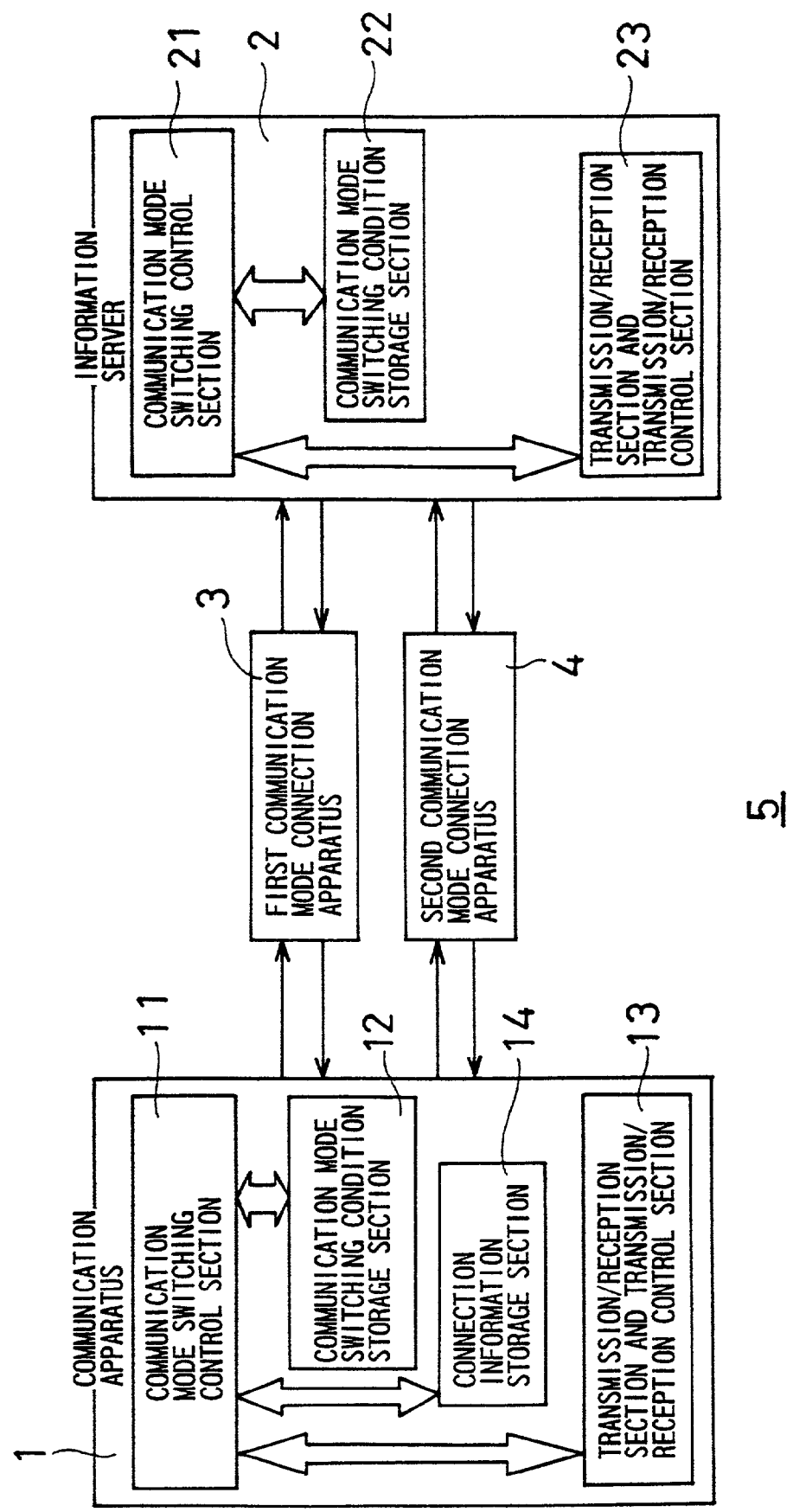
FIG. 1 is a block diagram showing a communication system 5 of an embodiment of the invention.

Now referring to the drawings, preferred embodiments of the invention are described below.

FIG. 1 is a block diagram showing a communication system 5 of an embodiment of the invention. The communication system 5 comprises a communication apparatus 1, an information server 2, a first communication mode connection apparatus 3 that connects communication between the first communication apparatus 1 and the information server 2 in a first communication mode, and a second communication mode connection apparatus 4 that connects communication between the communication apparatus 1 and the information server 2 in a second communication mode.

The communication apparatus 1 comprises a communication mode switching control section 11, a communication mode switching condition storage section 12, a transmission/reception section and transmission/reception control section 13 serving as the communication means, and a connection information storage section 14.

The information server 2 comprises a communication mode switching control section 21, a transmission/reception section and transmission/reception control section 23, and a communication mode switching condition storage section 22.

In the communication apparatus 1 a connection with the information server 2 in the first communication mode is established via a connection apparatus 3 in the first communication mode, and then an information acquisition request is transmitted to the information server 2. After the information acquisition request is made, when the communication mode is switched from the side of the communication apparatus 1, the communication connection condition at that time is stored in the connection information storage section 14 as connection information. The connection information is, for example when the communication apparatus 1 is viewing a home page stored in the information server 2 through the Internet, the address of the displayed home page. According to a condition in the communication mode switching condition storage section 12, the communication mode switching control section 11 controls the transmission/reception section and transmission/reception control section 13 to perform switching of communication mode. In this embodiment, after switching from the first communication mode to the second communication mode, the communication connection condition can be automatically restored based on the connection information stored in the connection information storage section 14. Consequently, it is possible to save the communication charge and the expense in effort and time necessary for restoring the communication connection condition, and the communication mode can be easily switched.

When the communication mode is switched from the side of the information server 2, based on a condition in the communication mode switching condition storage 22, the communication mode switching control section 21 controls the transmission/reception section and transmission/reception control section 23 to transmit a communication mode switching instruction to the communication apparatus 1.

The above-mentioned operations will be described with reference to the flowcharts shown in FIGS. 2 to 8.

Figure 2:
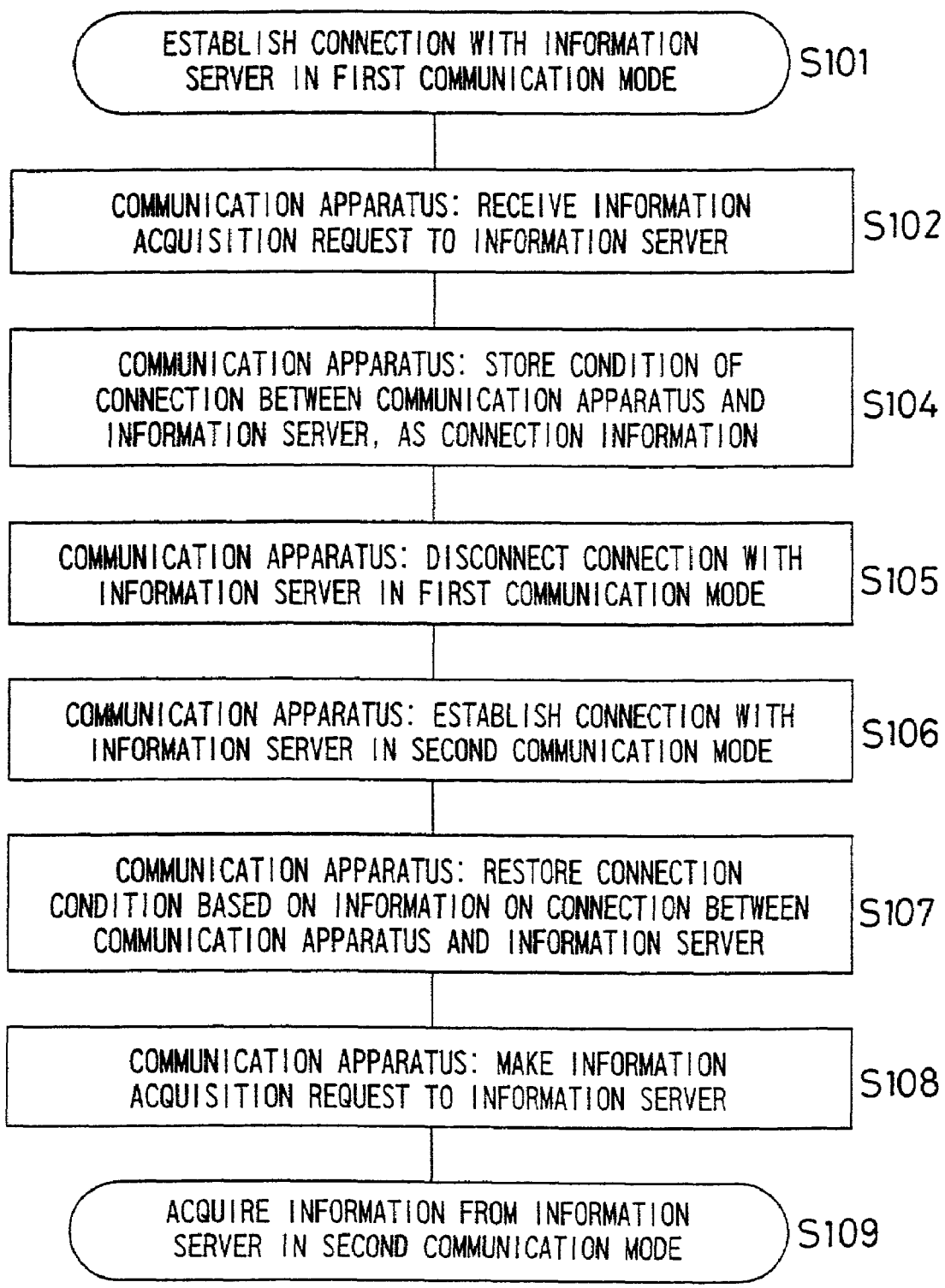
FIG. 2 is a flowchart showing a first communication control procedure in the communication system 5.

FIG. 2 is a flowchart showing a first communication control procedure in the communication system 5. First, the communication apparatus 1, while connecting with the information server 2 in the first communication mode (step S101), receives an information acquisition request from the operator (step S102), and stores the condition of communication connection between the communication apparatus 1 and the information server 2 into the connection information storage section 14 as connection information (step S104).

Then, in the communication apparatus 1 the communication with the information server 2 in the first communication mode is disconnected (step S105), a connection with the information server 2 in the second communication mode is established (step S106), and the communication connection condition is restored based on the connection information stored in the connection information storage section 14 (step S107). Then, the communication apparatus 1 transmits the information acquisition request to the information server 2 in the second communication mode (step S108), and acquires the information from the information server 2 in the second communication mode (step S109).

Figure 3:
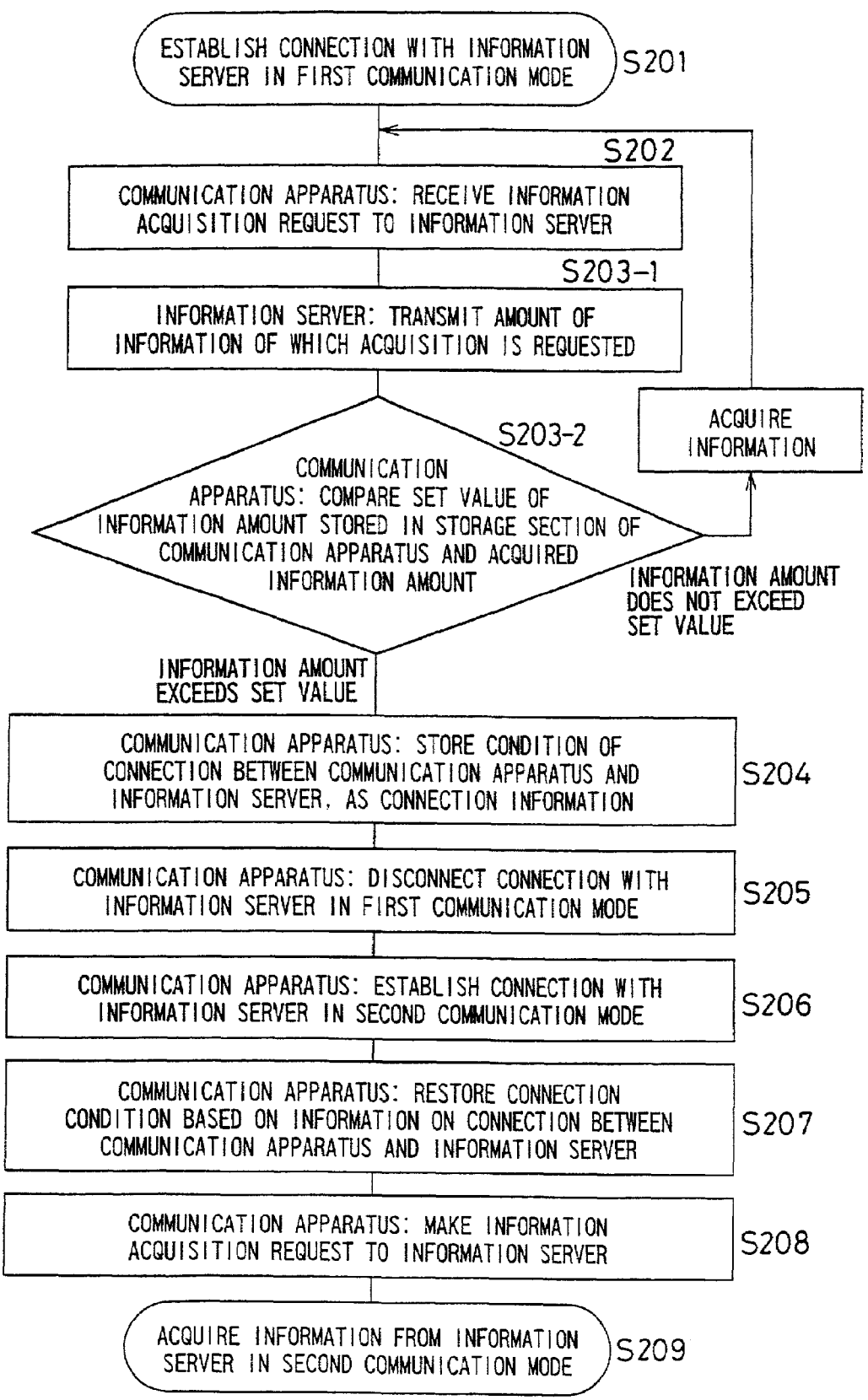
FIG. 3 is a flowchart showing a second communication control procedure in the communication system 5.

FIG. 3 is a flowchart showing a second communication control procedure in the communication system 5. In the control procedure shown in FIG. 3, the following steps are added between step S102 and step S104 of the control procedure shown in FIG. 2: The information server 2 transmits to the communication apparatus 1 the amount of the information of which acquisition is required (step S203-1), and the communication apparatus 1 receives this and the information amount acquired from the information server 2 is compared with the set value of the information amount stored in the switching condition storage section 12 of the communication apparatus 1 (step S203-2).

For example, in cases where a set value 10 Kbytes is set in the switching condition storage section 12 of the communication apparatus 1, when the amount of the information to be transferred from the information server is 9 Kbytes, the communication mode is not switched, and when the amount is 11 Kbytes, the communication mode is switched. In this embodiment, the communication mode is switched when the amount of the information to be acquired from the information server 2 exceeds the set value stored in the switching condition storage section 12 of the communication apparatus 1, and the information is acquired without the communication mode switched when the amount does not exceed the set value. However, control may be performed so that the communication mode is switched when the amount of the information to be acquired from the information server 2 does not exceed the set value stored in the switching condition storage section 12 of the communication apparatus 1 and the information is acquired without the communication mode switched when the amount exceeds the set value.

Figure 4:
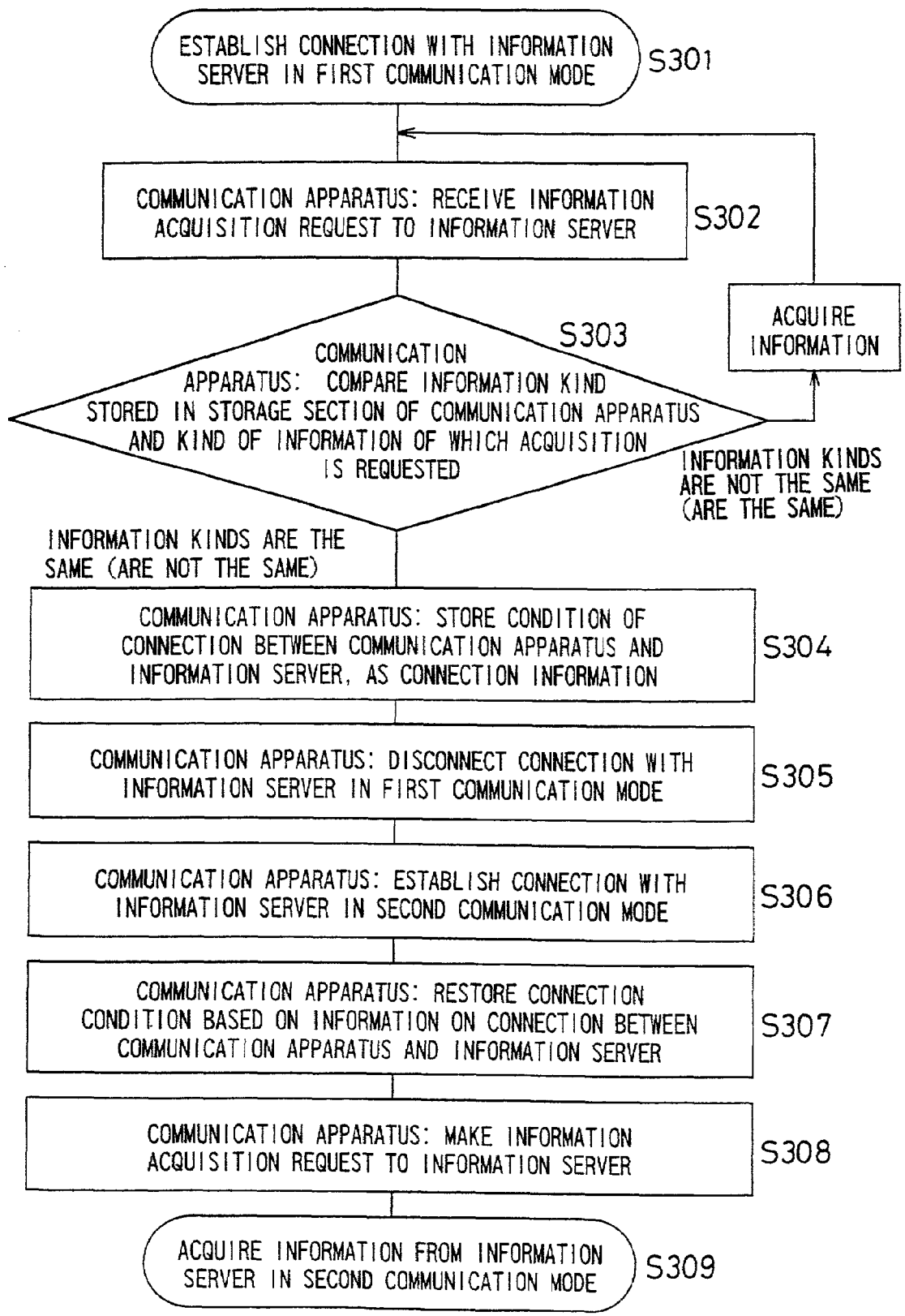
FIG. 4 is a flowchart showing a third communication control procedure in the communication system 5.

FIG. 4 is a flowchart showing a third communication control procedure in the communication system 5. In the control procedure shown in FIG. 4, the following step is added between step S102 and step S104 of the control procedure shown in FIG. 2: The information kind (text, an image, a moving image, sound or the like) stored in the switching condition storage section 12 of the communication apparatus 1 and the kind of the information of which acquisition is requested are compared (step S303).

TABLE 1 shows an example of an information kind table stored in the switching condition storage section 12 of the communication apparatus 1.

TABLE 1

| Information kind | Text | Image | Sound | Moving image |
|---|---|---|---|---|
| Communication mode | 1st mode | 1st mode | 2nd mode | 2nd mode |

In TABLE 1, a fixed communication mode is used for each information kind such that the first communication mode is used for text data and image data and the second communication mode, for sound and moving images. By comparing the kind of the requested information with the information kind table of TABLE 1, when the kind of the information requested in the first communication mode is a moving image or sound, the communication mode is not switched and the information is acquired in the first communication mode, and when the information to be acquired from the information server 2 is text or image data, the communication mode is switched. As described above, control can be performed so that when the communication mode fixed for each information kind and the current communication mode are the same, the information is acquired with the communication mode switched and when the communication modes are not the same, the information is acquired without the communication mode switched. Control may be performed so that when the communication mode fixed for each information kind and the current communication mode are the same, the communication mode is not switched and when the communication modes are not the same, the communication mode is switched.

Figure 5:
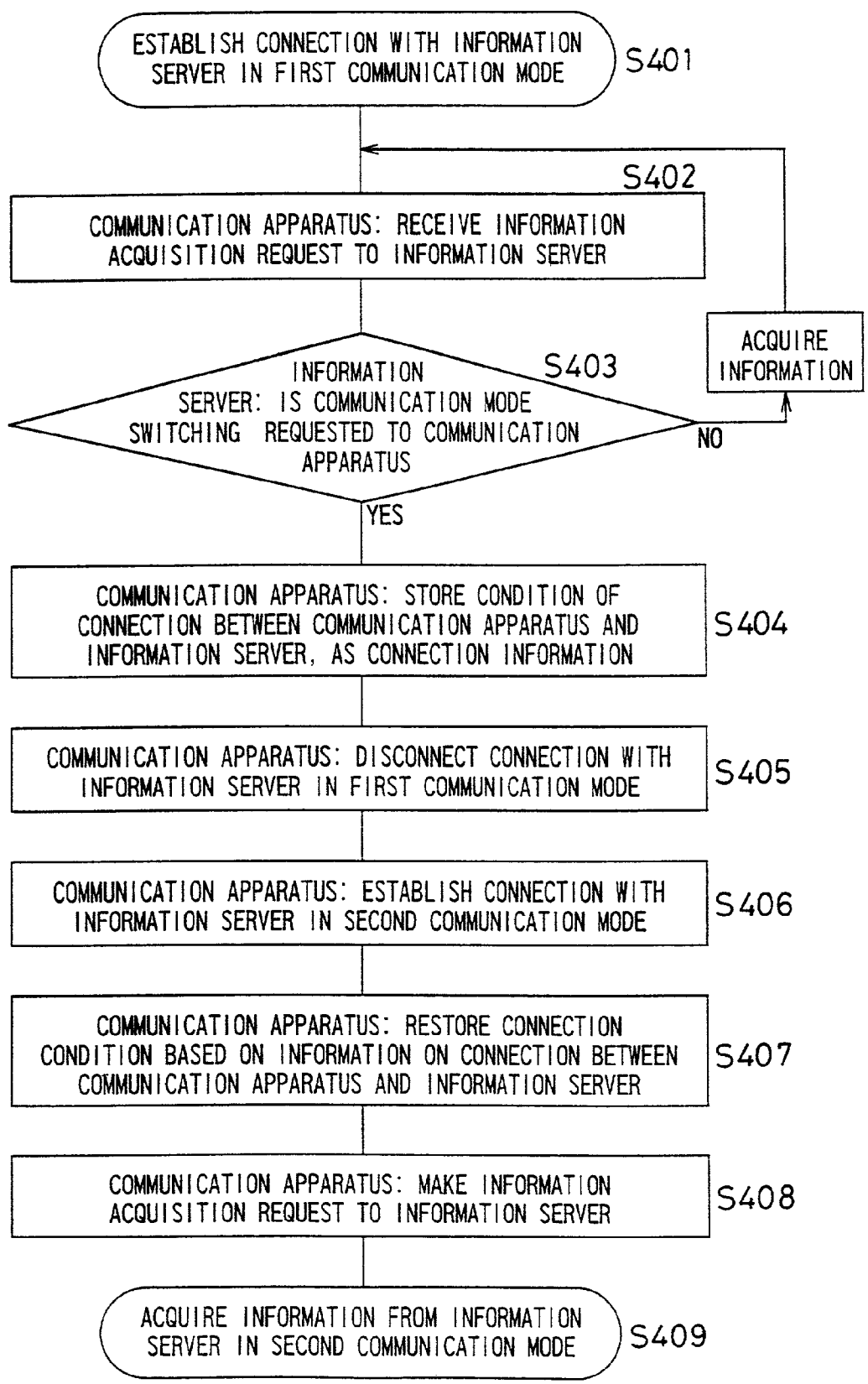
FIG. 5 is a flowchart showing a fourth communication control procedure in the communication system 5.

FIG. 5 is a flowchart showing a fourth communication control procedure in the communication system 5. In the control procedure shown in FIG. 5, the following step is added between step S102 and S104 of the control procedure shown in FIG. 2: When a communication mode switching request to the communication apparatus is received from the information server 2 (step S403-Y), the communication mode is switched in response to the communication mode switching request, and when no communication mode switching request is received (step S403-N), the communication mode is not switched and the information is acquired in the first communication mode.

Figure 6:
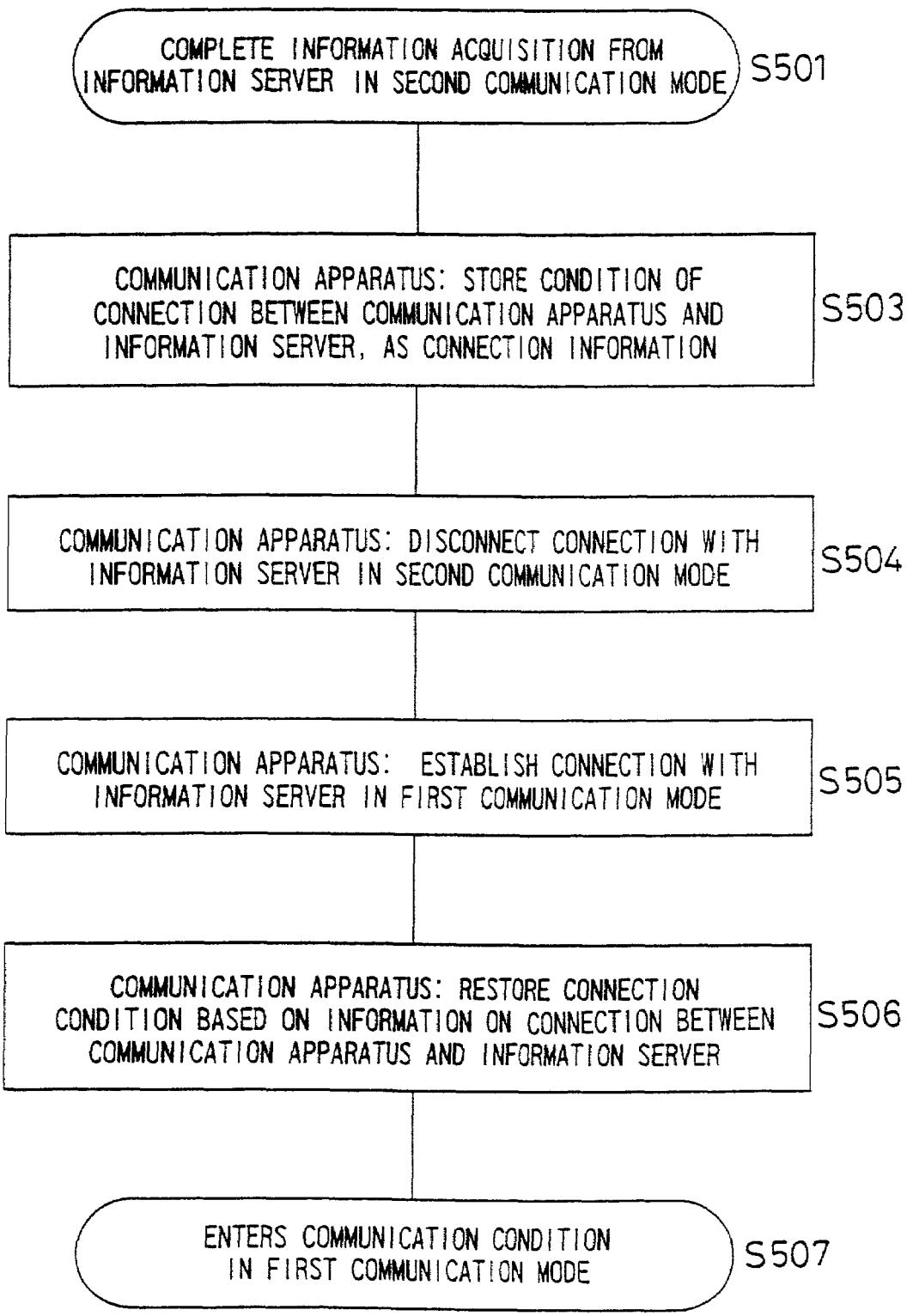
FIG. 6 is a flowchart showing a fifth communication control procedure in the communication system 5.

FIG. 6 is a flowchart showing a fifth communication control procedure in the communication system 5. In the control procedure of the communication apparatus 1 shown in FIG. 6, after information acquisition from the information server 2 in the second communication mode is completed (step S501), the condition of communication connection between the communication apparatus 1 and the information server 2 is stored into the connection information storage section 14 as connection information (step S503), and the connection with the information server 2 in the second communication mode is disconnected (step S504). A connection with the information server 2 in the first communication mode is again established (step S505), and the communication connection condition is restored based on the information on the connection between the communication apparatus 1 and the information server 2 (step S506), so that the communication system 5 enters the communication condition in the first communication mode (step S507).

Figure 7:
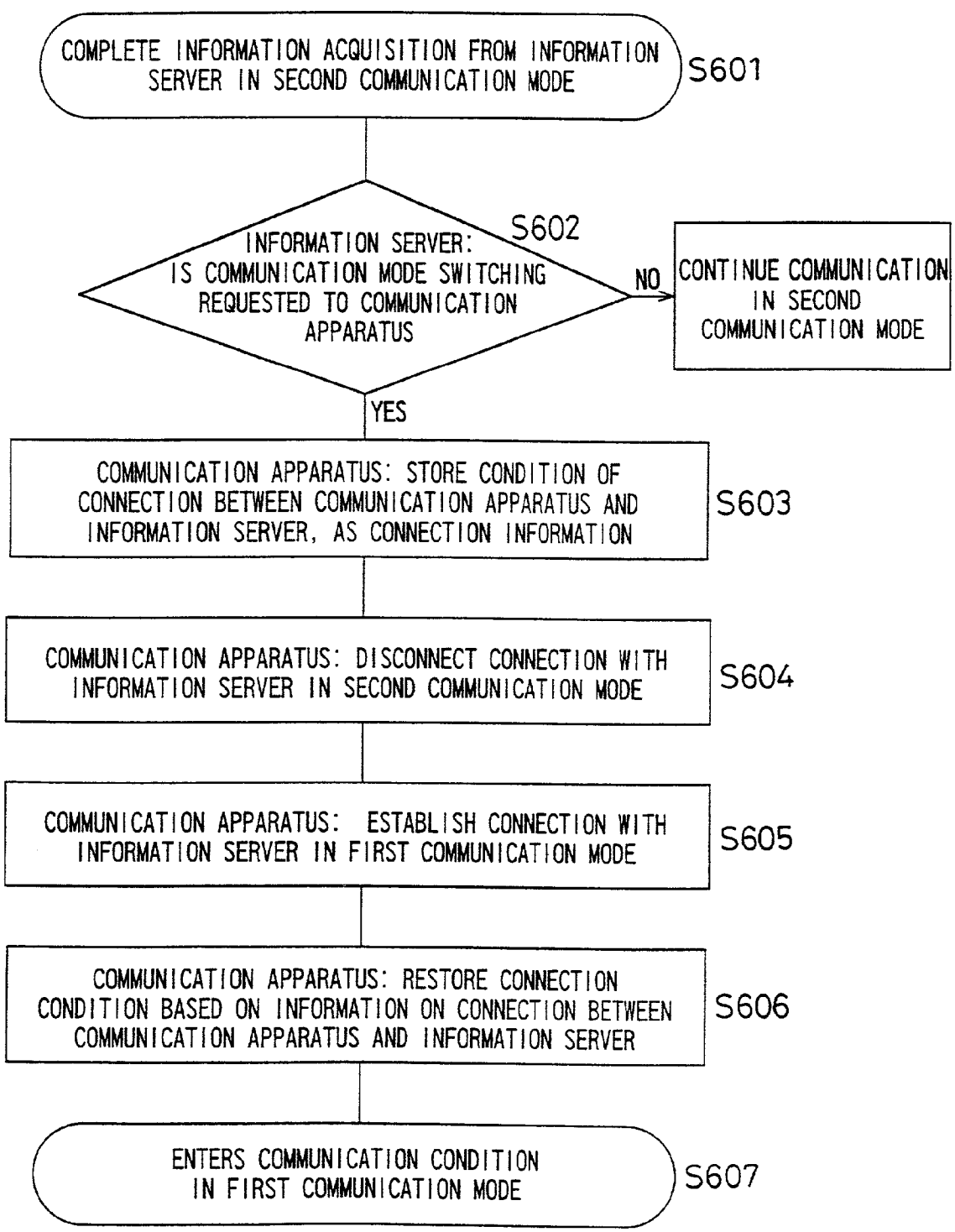
FIG. 7 is a flowchart showing a sixth communication control procedure in the communication system 5.

FIG. 7 is a flowchart showing a sixth communication control procedure in the communication system 5. In the control procedure shown in FIG. 7, the following step is added between step S501 and step S503 of the control procedure shown in FIG. 6: When a communication mode switching request to the communication apparatus 1 is received from the information server 2 (S602-Y), switching to the first communication mode is performed, and when no communication mode switching request is received (S602-N), switching to the first communication mode is not performed and the communication in the second communication mode is continued.

Figure 8:
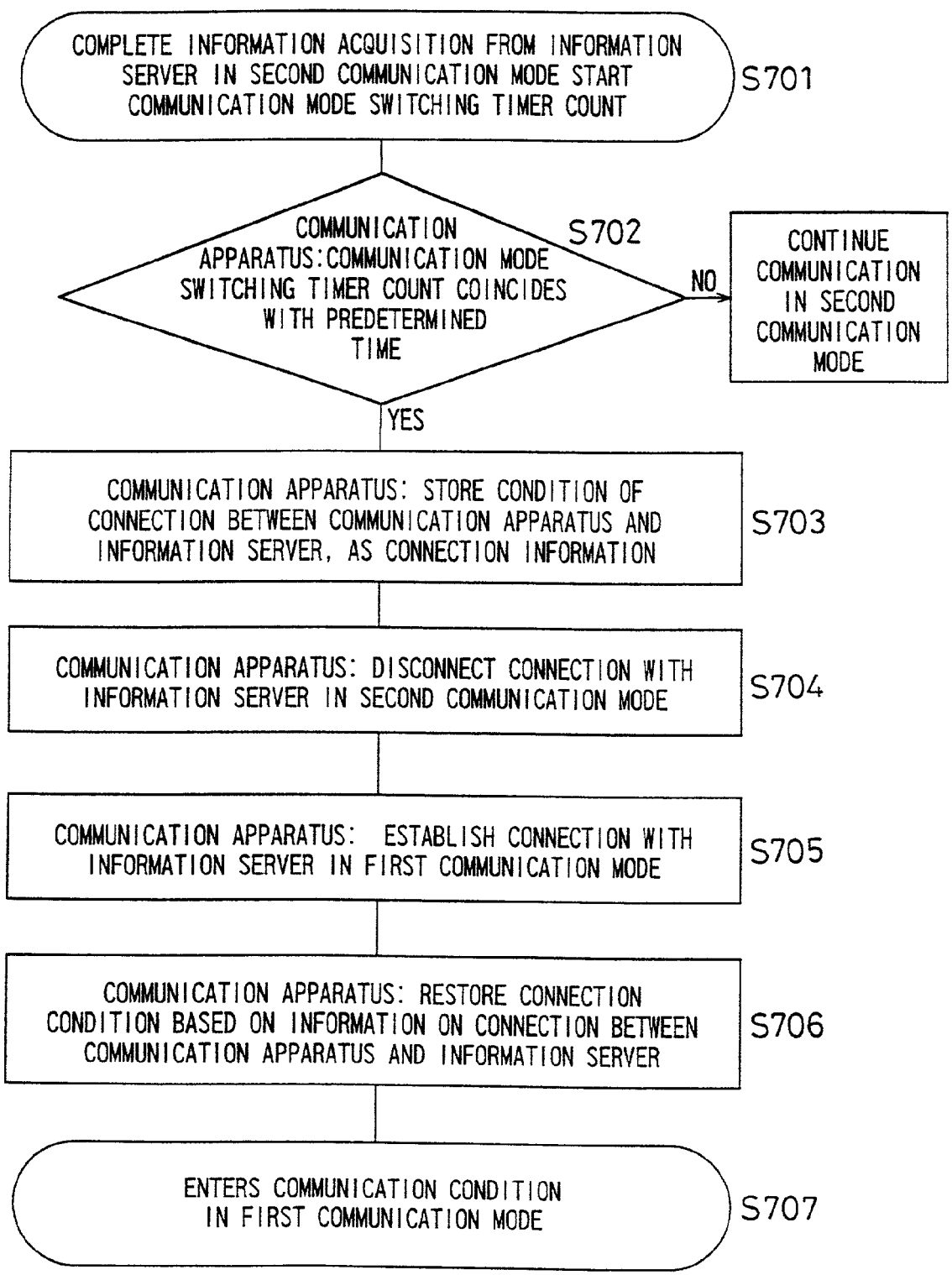
FIG. 8 is a flowchart showing a seventh communication control procedure in the communication system 5.

FIG. 8 is a flowchart showing a seventh communication control procedure in the communication system 5. In the control procedure shown in FIG. 8, the following step is added between step S501 and S503 of the control procedure shown in FIG. 6: When the communication mode switching timer count in the communication apparatus 1 coincides with a predetermined time (S702-Y), switching to the first communication mode is performed, and when the communication mode switching timer count does not coincide with the predetermined time (S702-N), switching is not performed and the communication in the second communication mode is continued. By this control, the communication mode can be switched after the predetermined time has elapsed since the completion of information acquisition.

Figure 9:
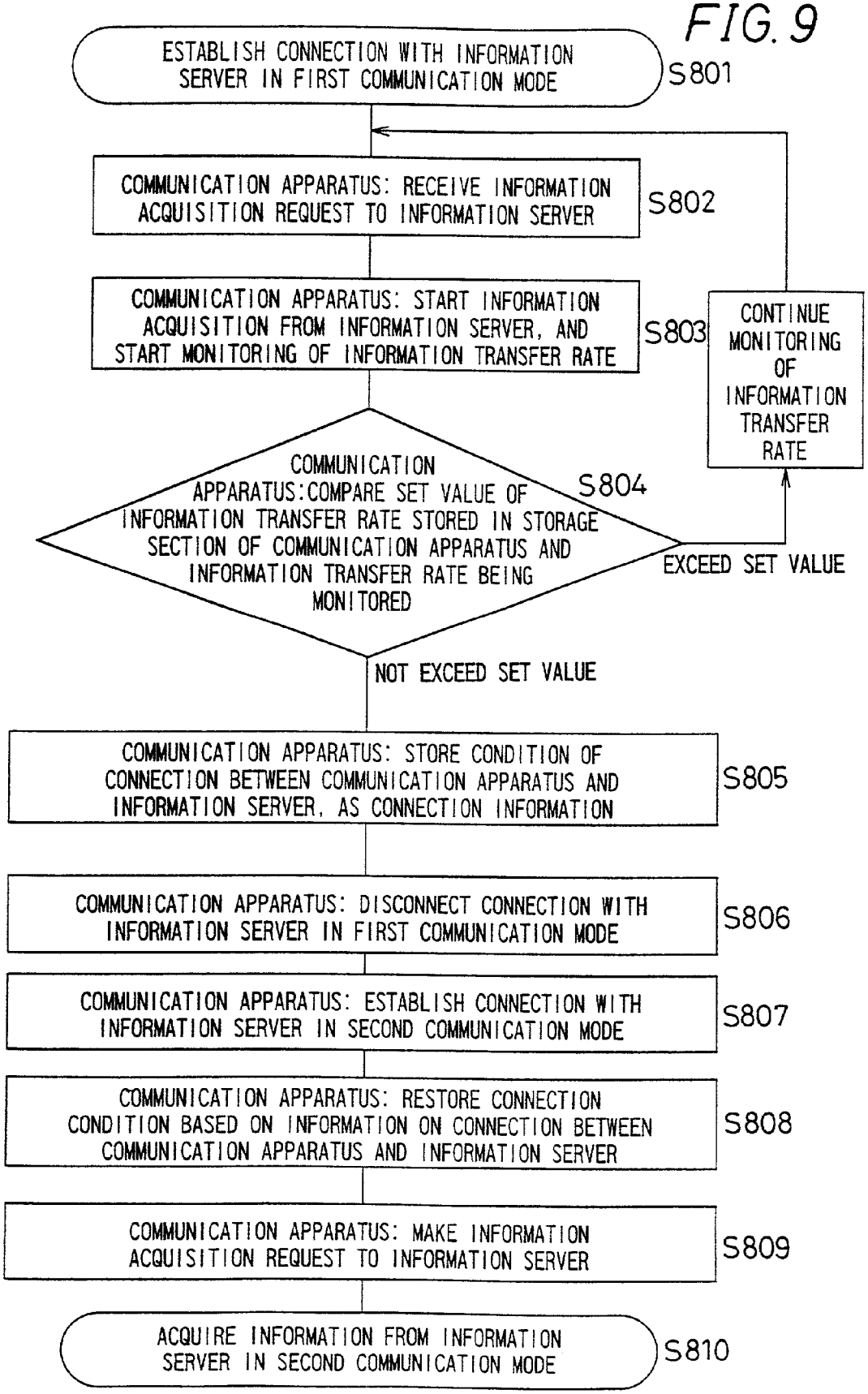
FIG. 9 is a flowchart showing an eighth communication control procedure in the communication system 5.

FIG. 9 is a flowchart showing an eighth communication control procedure in the communication system 5. First, the communication apparatus 1, while connecting with the information server 2 in the second communication mode (step S801), makes an information acquisition request to the information server (step S802), starts information acquisition from the information server 2, and at the same time, monitoring of the information transfer rate is started (step S803). Then, the communication apparatus 1 compares a set value of the information transfer rate stored in the switching condition storage section 12 of the communication apparatus 1 and the information transfer rate being monitored (step S804).

When the information transfer rate does not exceed the set value in the comparison at step S804, the condition of communication connection between the communication apparatus 1 and the information server 2 is stored into the connection information storage section 14 as connection information (step S805), the connection with the information server 2 in the first communication mode is disconnected (step S806), and a connection with the information server 2 in the second communication mode is established (step S807). Then, the condition of communication connection between the communication apparatus 1 and the information server 2 is restored based on the connection information (step S808), the information acquisition request is transmitted to the information server 2 (step S809), and the information from the information server 2 in the second communication mode is acquired (step S810).

When the information transfer rate exceeds the set value in the comparison at step S804, the communication mode is not switched, and the information is acquired in the first communication mode.

After step S810 shown in FIG. 9, the control procedure shown in FIG. 6, the control procedure shown in FIG. 7, or the control procedure shown in FIG. 8 may be added.

Figure 10:
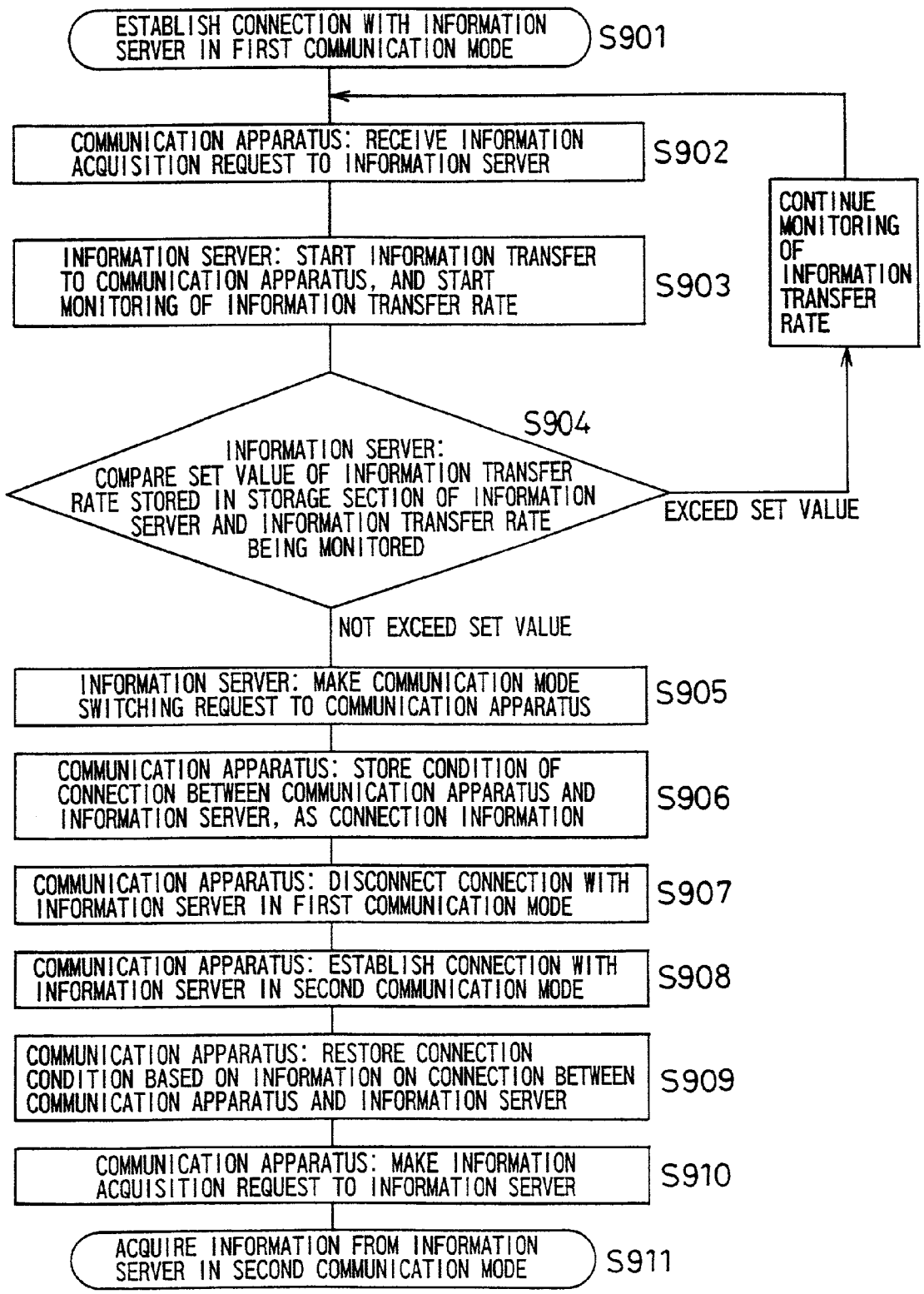
FIG. 10 is a flowchart showing a ninth communication control procedure in the communication system 5.

FIG. 10 is a flowchart showing a ninth communication control procedure in the communication system 5. First, the communication apparatus 1, while connecting with the information server 2 in the first communication mode (step S901), makes an information acquisition request to the information server 2 (step S902) Then, the information server 2 starts information transfer, and at the same time, starts monitoring of the information transfer rate (step S903) The information server 2 compares a set value of the information transfer rate stored in the switching condition storage section 22 and the information transfer rate being monitored (step S904).

When the information transfer rate does not exceed the set value in the comparison at step S904, the information server 2 transmits a communication mode switching request to the communication apparatus 1 (step S905). When the communication apparatus receives this, the condition of communication connection between the communication apparatus 1 and the information server 2 is stored into the connection information storage section 14 as connection information (step S906), the connection with the information server 2 in the first communication mode is disconnected (step S907), and a connection with the information server 2 in the second communication mode is established (step S908). Then, the condition of communication connection between the communication apparatus 1 and the information server 2 is restored based on the connection information (step S909), the information acquisition request is transmitted to the information server 2 (step S910), and the information from the information server 2 is acquired in the second information mode (step S911).

When the information transfer rate exceeds the set value in the comparison at step S904, the information server 2 does not transmit the communication mode switching request.

After step S911 shown in FIG. 10, the control procedure shown in FIG. 6, the control procedure shown in FIG. 7, or the control procedure shown in FIG. 8 may be added.

Figure 11:
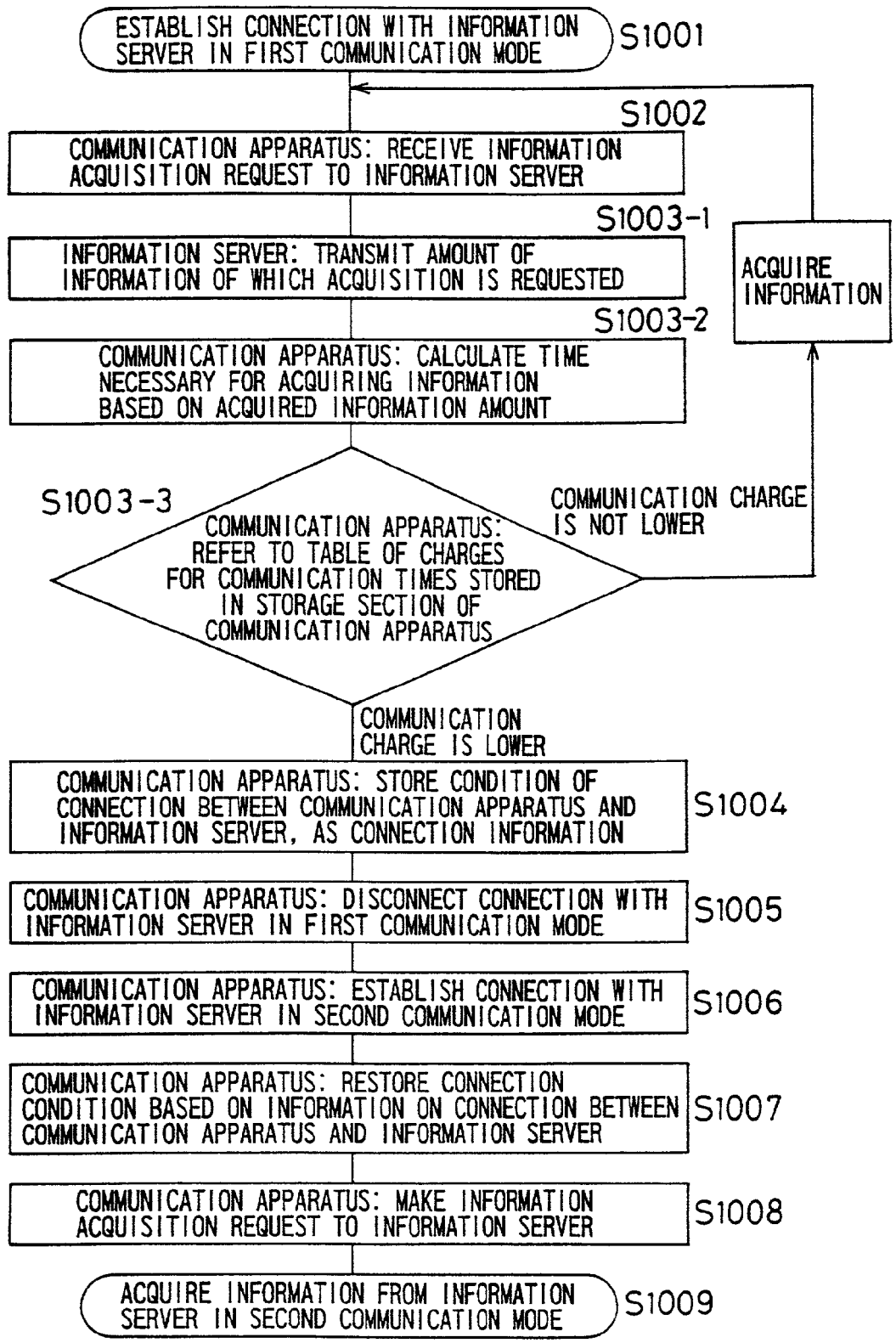
FIG. 11 is a flowchart showing a tenth communication control procedure in the communication system 5.

FIG. 11 is a flowchart showing a tenth communication control procedure in the communication system 5. In the control procedure shown in FIG. 11, the following steps are added between step S102 and step S104 of the control procedure shown in FIG. 2: The information server 2 transmits the amount of the information of which acquisition is requested (step S1003-1), and the communication apparatus 1 calculates the time necessary for acquiring the information based on the acquired information amount (step S1003-2) and determines whether to execute switching of communication mode or not with reference to a communication charge table stored in the communication mode switching condition storage section 12 of the communication apparatus 1 (step S1003-3).

At this time, when it is determined that switching the communication mode makes the communication charge lower from the communication charge table being referred to, the communication mode is switched. TABLE 2 shows an example of the table of communication charges for communication times stored in the switching condition storage section 12.

TABLE 2

| Elapsed communication time (sec.) | 30 | 60 | 90 | 120 |
|---|---|---|---|---|
| Charge in 1st mode (¥) (¥50/60 sec.) | 50 | 50 | 100 | 100 |
| Charge in 2nd mode (¥) (¥10/10 sec.) | 30 | 60 | 90 | 120 |

In the communication charge table of TABLE 2, communication charges for elapsed communication times are stored for each of the first and the second communication modes. In this example, in the first communication mode, 50 yen are additionally charged every 60 seconds, and in the second communication mode, 10 yen are additionally charged every 10 seconds.

In cases where the time necessary for acquiring the information from the information server 2 is 20 seconds under a condition where the time of communication in the first communication mode from the start of communication to the start of information acquisition exceeds 30 seconds, when the information is acquired in the first communication mode without the communication mode switched, the communication charge is 50 yen, and when the information is acquired with the communication mode switched to the second communication mode, the communication charge is 70 yen, which is higher. Therefore, the communication apparatus 1 acquires the information without switching the communication mode. On the contrary, in cases where the time necessary for acquiring the information is 40 seconds, when the information is acquired in the first communication mode without the communication mode switched, the communication charge is 100 yen, and when the information is acquired with the communication mode switched to the second communication mode, the communication charge is 90 yen, which is lower. Therefore, switching of communication mode is performed, with the result that savings in communication charge can be achieved.

Figure 12:
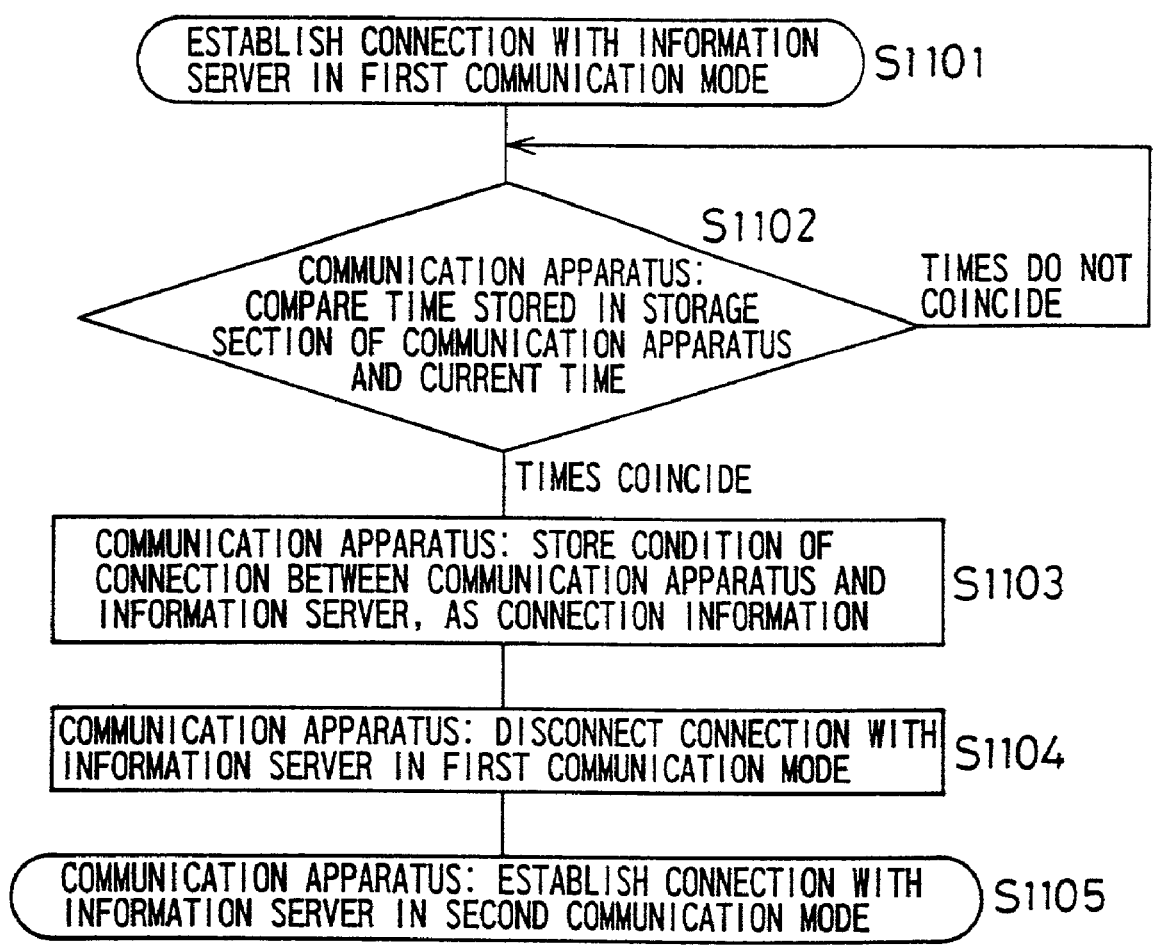
FIG. 12 is a flowchart showing an eleventh communication control procedure in the communication system 5.

FIG. 12 is a flowchart showing an eleventh communication control procedure in the communication system 5. In the control procedure of the communication apparatus shown in FIG. 12, first, while the communication apparatus connects with the information server 2 in the first communication mode (step S1101), a predetermined time stored in the switching condition storage section 12 of the communication apparatus 1 is compared with the current time, and whether to execute switching of communication mode or not is determined (step S1102).

When the current time and the stored predetermined time coincide with each other in the determination at step S1102, the condition of communication connection between the communication apparatus 1 and the information server 2 is stored into the connection information storage section 14 as connection information (step S1103). Then, the communication with the information server 2 in the first communication mode is disconnected (step S1104), a connection with the information server 2 in the second communication mode is established (step S1105), and the communication connection condition is restored based on the connection information stored in the connection information storage section 14 (step S1106).

By doing this, a communication mode in which the communication charge is low during a time period such as nighttime and a communication mode in which the transfer rate is high during a time period such as nighttime can be supported, with the result that savings in communication-charge or -time can be efficiently achieved.

Figure 13:
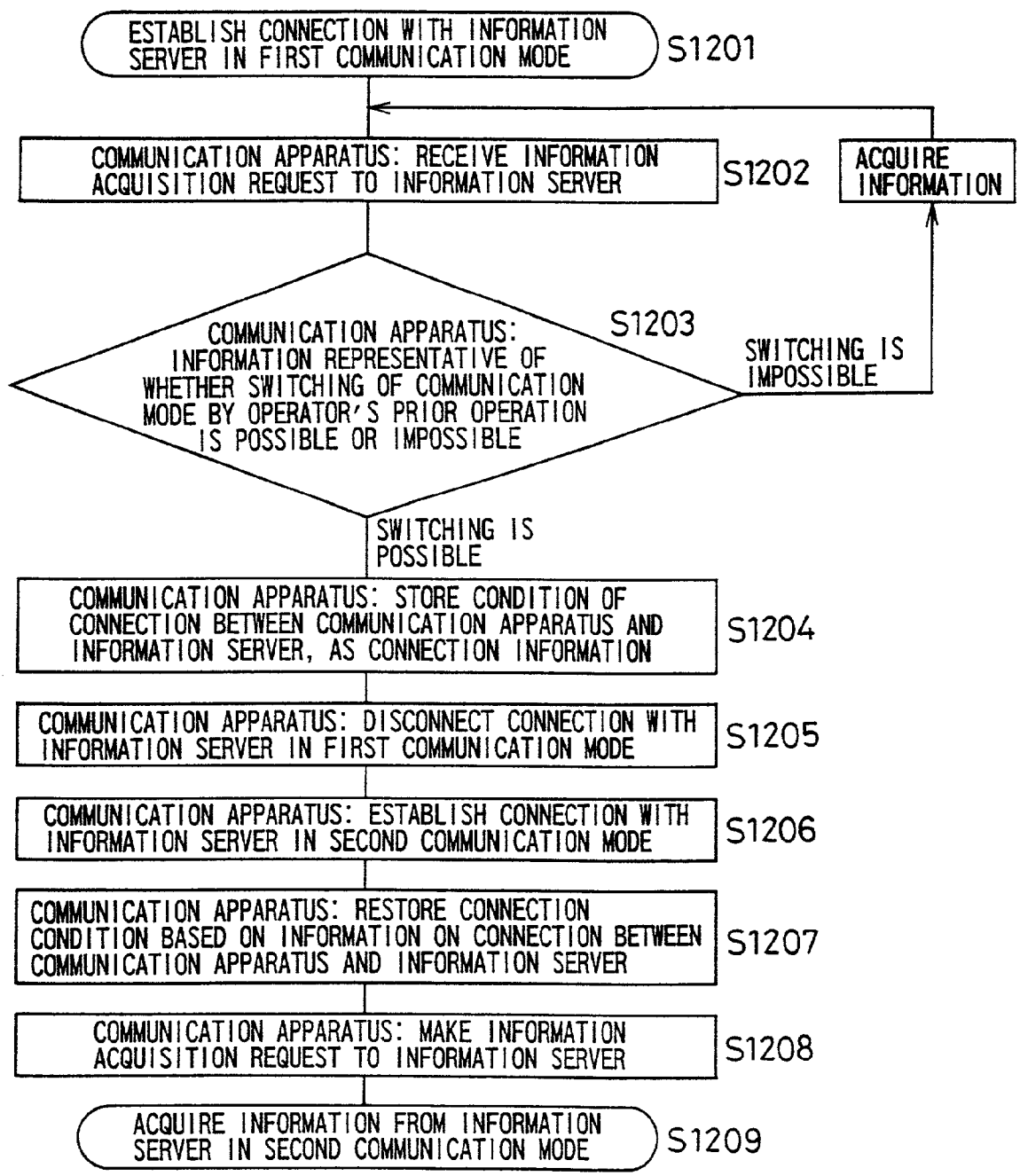
FIG. 13 is a flowchart showing a twelfth communication control procedure in the communication system 5.

FIG. 13 is a flowchart showing a twelfth communication control procedure in the communication system 5. In the control procedure shown in FIG. 13, the following step is added between step S102 and step S104 of the control procedure shown in FIG. 2: Based on information representative of whether switching of the communication mode by the operator's prior operation is possible or impossible, whether to execute switching of communication mode or not is determined (step S1203). In this control procedure, the communication mode is switched only when switching is possible, and when switching is impossible, the information is acquired without the communication mode switched.

Figure 14:
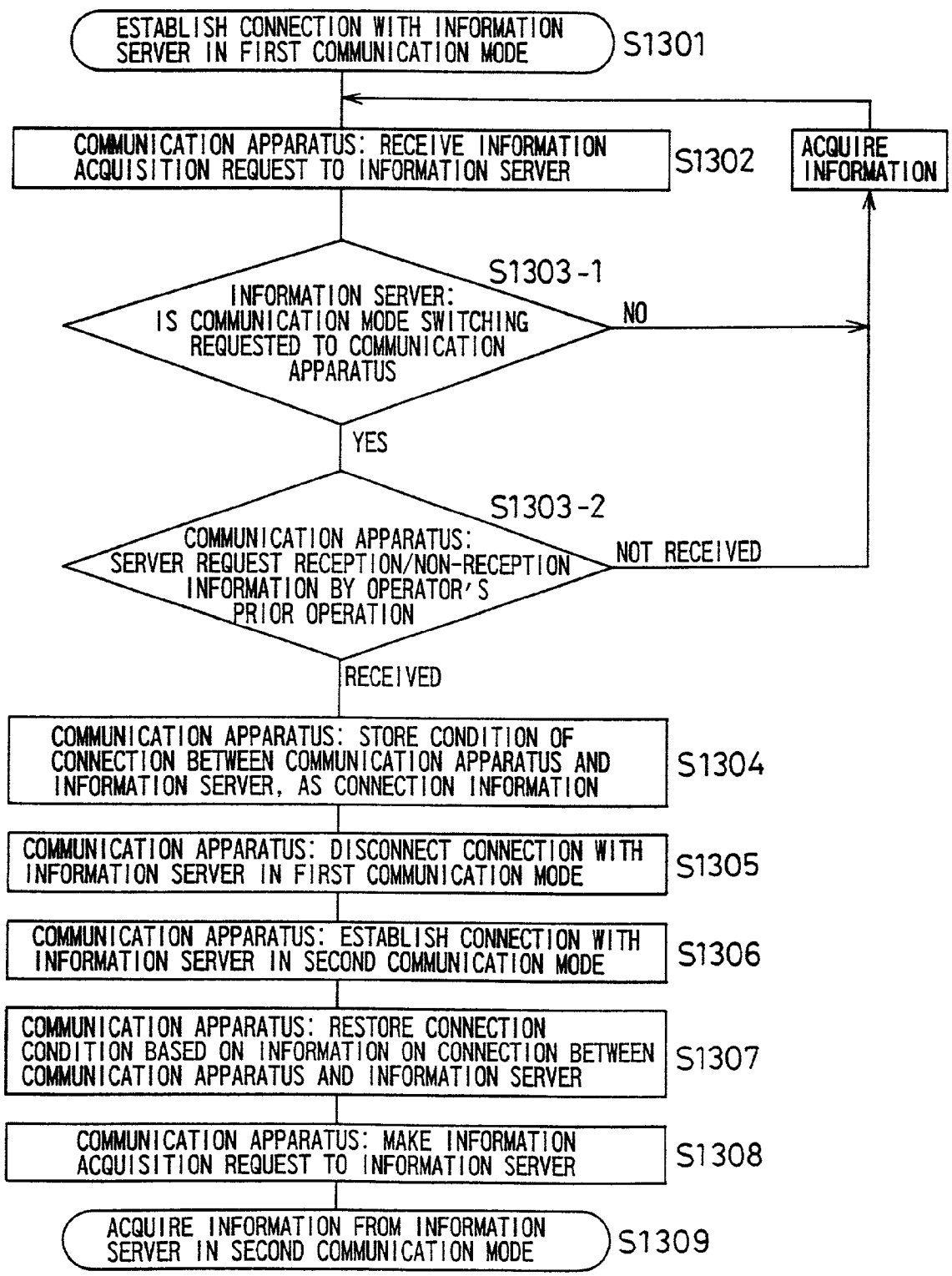
FIG. 14 is a flowchart showing a thirteenth communication control procedure in the communication system 5.

FIG. 14 is a flowchart showing a thirteenth control procedure in the communication system 5. In the control procedure shown in FIG. 14, the following step is added between step S403 and S404 of the control procedure shown in FIG. 5: Based on server request reception/non-reception information stored by the operator's prior operation, whether to receive the request or not is determined (step S1303-2).

In this control procedure, whether a communication mode switching request from the information server 2 to the communication apparatus 1 is received or not is determined at step S1303-1, and when the communication mode switching request from the information server 2 to the communication apparatus 1 is received (step S1303-1-Y), the process proceeds to step S1303-2. When the switching request is not received (step S1303-1-N), the information is acquired without the communication mode switched.

Further, the information is received with the communication mode switched when the request is received and without the communication mode switched when the request is not received in the determination at step S1303-2.

Figure 15:
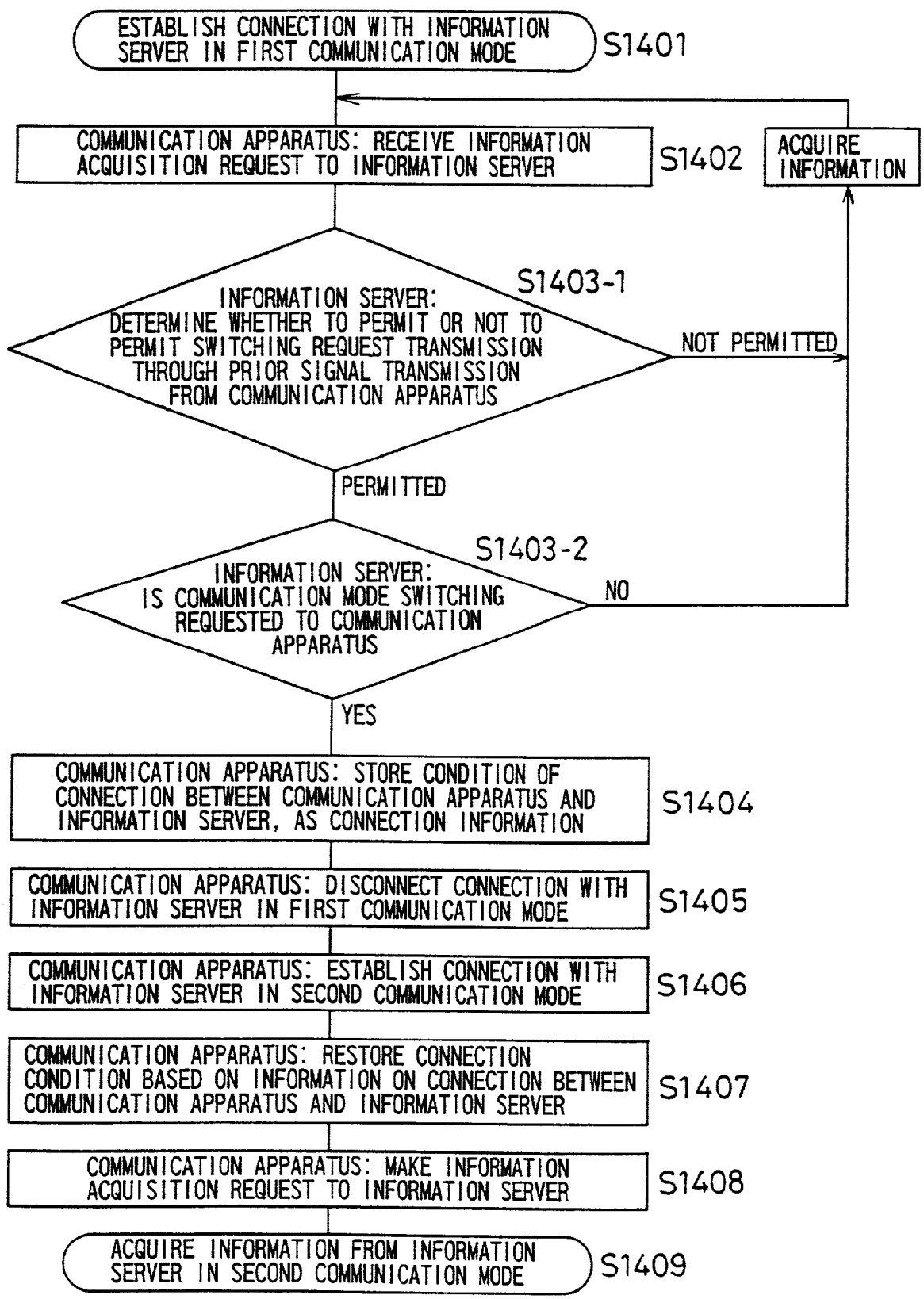
FIG. 15 is a flowchart showing a fourteenth communication control procedure in the communication system 5.

FIG. 15 is a flowchart showing a fourteenth communication control procedure in the communication system 5. In the control procedure shown in FIG. 15, the following step is added between step S402 and S403 of the control procedure shown in FIG. 5: Based on switching request transmission permission/non-permission information acquired through a prior signal transmission from the communication apparatus 1, the information server 2 determines whether to transmits a communication mode switching instruction or not (step S1403-1)

When the information server 2 determines at step S1403 that the switching request transmission permission/non-permission information acquired through the prior signal transmission from the communication apparatus 1 represents that the transmission is permitted, the process proceeds to step S1403-2, and when the information server 2 determines that the information represents that the transmission is not permitted, the information is acquired in the first communication mode without the communication mode switched.

At step S1403-2, whether a communication mode switching request from the information server 2 to the communication apparatus 1 is received or not is determined, and when the communication mode switching request from the information server 2 to the communication apparatus 1 is received (step S1403-2-Y), the communication mode is switched, and when the switching request is not received (step S1403-2-N), the information is acquired without the communication mode switched.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication system comprising:
an information server capable of performing communication in first and second communication modes; and
a communication apparatus which is provided as an integrated unit and is capable of performing communication in the first and the second communication modes, the communication apparatus including:
communication circuitry capable of performing communication with the information server in the first and the second communication modes to receive information sent from the information server in response to an information acquisition request generated by the communication apparatus and communicated to the information server via the communication circuitry;
an output device for outputting the information received from the information server;
a connection information storage section; and
a communication mode switching control section for controlling the switching of communication mode with the information server from the first communication mode to the second communication mode by storing into the connection information storage section connection information based on a condition of communication connection of the communication apparatus and the information server in the first communication mode at a time of the switching, releasing the connection of the communication circuitry with the information server in the first communication mode in a state in which a connection of the communication apparatus and the information server in the second communication mode is not established, establishing a connection with the information server in the second communication mode in a state in which a connection of the communication apparatus and the information server in the first communication mode is not established, and restoring the condition of communication connection based on the stored connection information.

2. The communication system of claim 1, wherein the communication apparatus further includes a switching condition storage section for storing a determination reference value, and wherein the communication mode switching control section compares an amount of information to be acquired from the information server and the determination reference value, and determines whether or not to execute switching of communication mode based on a result of the comparison.

3. The communication system of claim 1, wherein the communication mode switching control section determines whether or not to execute the switching of communication mode based on a kind of information to be acquired from the information server.

4. The communication system of claim 1, wherein the communication apparatus further includes a switching condition storage section for storing a communication charge for communication connection time in each of the first and the second communication modes, and
wherein the communication mode switching control section measures a communication connection time necessary for acquiring the requested information in each of the first and the second communication modes, and determines whether or not to execute the switching of communication mode based on the measured communication connection times and the communication charges for the communication connection times in the first and the second communication modes, respectively.

5. The communication system of claim 1, wherein the communication apparatus further includes a switching condition storage section for storing a time, and
wherein the communication mode switching control section compares a current time and the time stored in the switching condition storage section, to determine whether or not to execute the switching of communication mode.

6. The communication system of claim 1, wherein the communication mode switching control section determines whether or not to execute switching of communication mode based on an operator's operation.

7. The communication system of claim 1, wherein when a communication mode switching instruction is received from the information server, the communication mode switching control section switches the communication mode, based on the switching instruction.

8. The communication system of claim 7, wherein the communication apparatus transmits to the information server a signal representative of whether or not to transmit the communication mode switching instruction from the information server to the communication apparatus based on an operator's operation.

9. The communication system of claim 1, wherein when the communication mode switching instruction is received from the information server, the communication mode switching control section determines whether or not to follow the communication mode switching instruction from the information server based on an operator's operation.

10. The communication system of claim 1, wherein after information acquisition in the second communication mode is completed, the communication mode switching control section automatically disconnects the communication in the second communication mode, and establishes a connection with the information server in the first communication mode.

11. The communication system of claim 1, wherein after information acquisition in the second communication mode is completed, the communication mode switching control section receives a communication mode switching instruction from the information server, automatically disconnects the communication in the second communication mode based on the instruction from the information server, and again establishes a connection with the information server in the first communication mode.

12. The communication system of claim 1,
wherein after a specified time has elapsed since information acquisition in the second communication mode is completed, the communication mode switching control section automatically disconnects the communication in the second communication mode, and again establishes a connection with the information server in the first communication mode.

13. A communication system comprising:
an information server capable of performing communication in first and second communication modes; and
a communication apparatus which is provided as an integrated unit and is capable of performing communication in the first and the second communication modes, the communication apparatus including:
communication circuitry capable of performing communication with the information server in the first and the second communication modes to receive information sent from the information server in response to an information acquisition request generated by the communication apparatus and communicated to the information server via the communication circuitry;
an output device for outputting the information received from the information server;
a connection information storage section;
a switching condition storage section for storing a reference value of an information transfer rate; and
a communication mode switching control section for, when the communication circuitry is acquiring information from the information server in the first communication mode, monitoring a rate of information transfer from the information server, comparing the monitored information transfer rate and the reference value, and in cases in which the monitored information transfer rate does not exceed the reference value, storing connection information in the connection information storage section based on a condition of communication connection of the communication apparatus and the information server at that time, disconnecting the communication in the first communication mode in a state in which a connection of the communication apparatus and the information server in the second communication mode is not established, establishing a connection with the information server in the second communication mode in a state in which a connection of the communication apparatus and the information server in the first communication mode is not established, and restoring the communication connection condition based on the stored connection information.

14. A communication system comprising:
an information server capable of performing communication in first and second communication modes; and
a communication apparatus which is provided as an integrated unit and is capable of performing communication in the first and the second communication modes,
the information server including:
communication circuitry capable of performing communication with the communication apparatus in the first and the second communication modes;
a switching condition storage section for storing a reference value of an information transfer rate; and
a communication mode switching control section for, when the communication circuitry is transferring information to the communication apparatus in the first communication mode, monitoring the information transfer rate, comparing the monitored information transfer rate and the reference value, and in cases where the monitored information transfer rate does not exceed the reference value, causing the communication circuitry to transmit a communication mode switching instruction to the communication apparatus, and
the communication apparatus including:
communication circuitry capable of performing communication with the information server in the first and the second communication modes to receive information sent from the information server in response to an information acquisition request generated by the communication apparatus and communicated to the information server via the communication circuitry;
an output device for outputting the information received from the information server;

a connection information storage section; and a communication mode switching control section for, when the communication circuitry of the communication apparatus receives the communication mode switching instruction, causing connection information to be stored in the connection information storage section based on a condition of communication connection of the communication apparatus and the information server at that time, disconnecting the communication in the first communication mode in a state in which a connection of the communication apparatus and the information server in the second communication mode is not established, establishing a connection with the information server in the second communication mode in a state in which a connection of the communication apparatus and the information server in the first communication mode is not established, and restoring the communication connection condition based on the stored connection information.

15. A communication apparatus for communicating with an information server using different communication modes, the communication apparatus comprising:

a communication section for establishing communications with the information server in the different communication modes to receive information sent from the information server in response to an information acquisition request generated by the communication apparatus and communicated to the information server via the communication section;

an output device for outputting the information received from the information server;

a storage section; and a communication mode switching control section for controlling the switching of communication modes with the information server by storing connection information into the storage section based on a communication connection condition of the communication apparatus and the information server in a current communication mode, releasing the communication connection with the information server in a state in which a connection of the communication apparatus and the information server in a communication mode other than the current communication mode is not established, and establishing a communication connection with the information server in another communication mode in a state in which a connection of the communication apparatus and the information server in any other communication mode is not established and restoring the communication connection condition based on the stored connection information, wherein the communication section, the storage section, the output device and the communication mode switching control section are embodied in a portable terminal.

16. The communication apparatus of claim 15, wherein the connection information comprises a uniform resource locator (URL).

17. The communication apparatus of claim 15, wherein the communication mode switching control section controls the switching based on an instruction signal from the information server.

18. The communication apparatus of claim 15, wherein the communication mode switching control section controls the switching based on a comparison between an amount of data to be acquired from the information server and a reference amount of data.

19. The communication apparatus of claim 15, wherein the communication mode switching control section controls the switching in accordance with a type of information to be acquired from the information server.

20. The communication apparatus of claim 15, wherein the communication mode switching control section controls the switching based at least in part on communication charges.

21. The communication apparatus of claim 15, wherein the communication mode switching control section controls the switching based on a comparison between a current time and a specified time.

22. The communication apparatus of claim 15, wherein the communication mode switching control section controls the switching based at least in part on an operator's instruction.

* * * * *